US009518818B2

(12) United States Patent
Arnold (10) Patent No.: US 9,518,818 B2
(45) Date of Patent: Dec. 13, 2016

(54) DIGITAL MOVEMENT MEASURING DEVICE

(75) Inventor: Bertrand Arnold, London (GB)

(73) Assignees: Bertrand Arnold, London (GB); Jean-Claude Benarrosh, Savosa (CH); Helen Benarrosh, London (GB)

( * ) Notice: Subject to any disclaimer, the term of this patent is extended or adjusted under 35 U.S.C. 154(b) by 0 days.

(21) Appl. No.: 14/233,486

(22) PCT Filed: Jul. 20, 2012

(86) PCT No.: PCT/FR2012/051734
§ 371 (c)(1),
(2), (4) Date: Jan. 17, 2014

(87) PCT Pub. No.: WO2013/011249
PCT Pub. Date: Jan. 24, 2013

(65) Prior Publication Data
US 2014/0168664 A1    Jun. 19, 2014

(30) Foreign Application Priority Data
Jul. 21, 2011   (FR) ..................... 11 56629

(51) Int. Cl.
*G01B 11/14* (2006.01)
*G01D 5/34* (2006.01)

(52) U.S. Cl.
CPC ............ *G01B 11/14* (2013.01); *G01D 5/342* (2013.01)

(58) Field of Classification Search
CPC ......... G11B 7/093; G11B 7/0945; G11B 7/26; G01D 5/342; G01B 11/14
(Continued)

(56) References Cited

U.S. PATENT DOCUMENTS 3,705,308 A    12/1972  Lehovec
5,134,472 A *   7/1992  Abe ..................... H04N 7/188
                                                         348/155
(Continued)

FOREIGN PATENT DOCUMENTS

DE    103 15 139 A1    10/2004
EP    2 108 925         10/2009
(Continued)

OTHER PUBLICATIONS

International Search Report dated May 22, 2013, corresponding to PCT/FR2012/051734.

*Primary Examiner* — Kara E Geisel
*Assistant Examiner* — Dominic J Bologna
(74) *Attorney, Agent, or Firm* — Young & Thompson (57) ABSTRACT

A device for measuring movement of a mobile element moving in at least one direction, includes:
  a light source adapted to emit a light beam;
  at least one optical member intercepting the light beam and attached to the mobile element to track its movement;
  pixel type sensors capturing the transmitted beam determined by the relative position of the optical member relative to the light source, the pixels being disposed so that at least some of them receive illumination that varies with the position of the mobile element as it moves;
  a comparator module comparing the values obtained from the pixels of the sensors with two distinct thresholds in order to assign some of them a logic value;
  a calculation module determining the position of the mobile element from the data from the comparator module.

17 Claims, 5 Drawing Sheets

(58) Field of Classification Search
USPC .......................................... 356/601, 624, 640
See application file for complete search history.

(56) References Cited

U.S. PATENT DOCUMENTS

| | | | |
|---|---|---|---|
| 6,642,507 | B1 | 11/2003 | Kataoka |
| 7,957,558 | B2 * | 6/2011 | Lim .................... G05D 1/0253 |
| | | | 382/106 |
| 2009/0248351 | A1 | 10/2009 | Fujimoto |
| 2010/0271638 | A1 | 10/2010 | Torii et al. |

FOREIGN PATENT DOCUMENTS

| | | |
|---|---|---|
| FR | 2 565 216 | 12/1985 |
| GB | 2 357 334 | 6/2001 |
| JP | 61-32699 A | 2/1986 |
| JP | 01-70107 U | 5/1989 |
| JP | 05-248818 A | 9/1993 |
| JP | 2000-146546 A | 5/2000 |
| JP | 2008-232689 A | 10/2008 |
| WO | 2007/030731 A2 | 3/2007 |
| WO | 2008/045274 A2 | 4/2008 |

* cited by examiner

DIGITAL MOVEMENT MEASURING DEVICE

The invention relates to movement measurement device. Here the concept of movement measurement encompasses the measurement of a position relative to a reference position. As a general rule, a movement measurement device stores analog information from a sensor, converts it into digital data, and transmits it to a computer in order for the movement measurement to be processed.

BACKGROUND OF THE INVENTION

A movement measurement device utilizing an optical sensor is described in the document US 2009/0248351. A mobile element moves in a direction perpendicular to the direction of emission of a light beam and a linear optical sensor with a pixel array of CCD (Charge-Coupled Device) type or CMOS (Complementary Metal Oxide Semiconductor) type stores the data obtained in this way relating to the luminous flux transmitted and partially blocked by the mobile element. The analog information from the sensors is converted into digital data that is integrated into a calculation module that determines the position of the mobile element from the latter data.

Such a device has disadvantages, in particular conversion of all of the analog information from the sensor into digital data. Analog noise is added to the errors and to the digital conversion noise. This undesirable noise limits the dynamic (signal to noise ratio) of the measured signal. Furthermore, conversion necessitates a non-negligible calculation time and a non-negligible calculation capacity.

In particular, when the device is used in a microphone, the background noise and analog-digital conversion are considered the main factors limiting the dynamic.

It would therefore appear advantageous to circumvent the analog dynamic limit and to limit as much as possible the drawbacks of analog-digital conversion.

SUMMARY OF THE INVENTION

To this end, the invention proposes a device for measuring movement of a mobile element moving in at least one direction, comprising:
  a light source adapted to emit a light beam;
  at least one optical member adapted to intercept the light beam and attached to said mobile element to track its movement;
  at least one pixel type sensor adapted to capture the transmitted beam determined by the relative position of the optical member relative to the light source, the pixels being disposed so that at least some of them receive illumination that varies with the position of the mobile element as it moves;
  a comparator module adapted to compare the values obtained from the pixels of said at least one sensor with two distinct thresholds and to assign them logic values so that:
  all luminous values below the first threshold are assigned the same first logic value;
  all luminous values above the second threshold are assigned the same second logic value;
  all luminous values situated between the two thresholds are respectively assigned a conversion of that value representative of that value adapted to be processed by the calculation means; and
  a calculation module adapted to determine the position of the mobile element from the data from the comparator module.

The use of a comparator module enables assignment to some pixels of the sensor of a logic value that does not necessarily correspond to the conversion of the analog signal received by the sensor into a digital signal. Thus the device is not dependent only on the performance of a converter or of associated calculation means.

Because of this, the calculation times necessary for determining the position of the mobile element are reduced, and likewise the associated calculation power. The transmission of the data can thus be simplified and its speed increased.

It will be noted that, additionally, the accuracy of the determination of the position of the mobile element is then dependent only on the number of pixels chosen and that it suffices to increase this number to improve it.

In particular, the first logic value may be the value 0 and the second logic value may be the value 1.

These thresholds may take any value between 0 and 1, in particular a first threshold for example between 0 and 0.5 and a second threshold between 0.5 and 1. The first threshold is equal to 0.1 and the second threshold is equal to 0.9, for example.

This notably makes it possible to determine accurately the position of the optical member by converting only a few analog values, which limits the use of the converter at the same time as improving the overall accuracy of the device.

In one particular embodiment, the optical member comprises a mask at least part of the contour of which forms a non-zero angle with said at least one direction of movement of the mobile element.

For example, the mask is a single piece mask the movement of the contour of which relative to the light source causes the illumination received by the pixels of the sensor to vary.

Alternatively, the mask is a mask including an opening or a slot movement of the internal contour of which varies the illumination received by the pixels of the sensor.

In another particular embodiment, the optical member is adapted to reflect a part of the light beam.

In this case the so-called reflection optical member reflects as a function of its movement a variable part of the light beam. Each reflected part of the light beam is then projected onto the sensor.

According to one possible feature, the device further includes a second optical member adapted to dimension the image of the contour of the first optical member and to focus it.

The use of such a supplementary member enables enhancement of the quality of the image received by the sensor, in particular when this member is placed on the optical path between the first optical member and the sensor. To this end, this second optical member is constituted of any means for focusing, redirecting or sizing this image of the first optical member on the sensor, such as lenses, optical fibers or mirrors.

According to one possible feature, the sensor is a linear optical sensor formed of at least one row of pixels disposed in a linear pattern.

In this way, the position of the optical member may be simply determined by calculating the distance between the pixels marking its contour. Other arrangements of pixels may nevertheless be envisaged.

To correct any errors linked to positioning or calculation errors, trigonometric correction of the movements of the optical member in directions other than that of the measured movement is effected.

Here the expression trigonometric correction refers to determining (calculating) sensor positioning errors by observing the deformations of the projected image relative to the sensor and deducing from them the angle of rotation of the sensor relative to its point of attachment to the mobile part.

The term trigonometric stems from the fact that to this end trigonometric mathematical relations well-known in themselves are used on the contour of the image as projected.

If the optical member has two parallel contours the distance between which is known beforehand, for example, the latter distance could be calculated and confirmed by measuring the distance between the contours of the image formed on the optical sensor.

The absence of angular movement about its point of attachment to the mobile part, in other words the absence of positioning errors, is characterized by an undeformed image projected onto the sensor.

Conversely, the geometrical deformation of the observed image will enable calculation of the angle of rotation relative to the nominal position using trigonometric relations.

The optical laws concerning the projection of the shape or the inclination of each contour of the optical member onto the sensor or, where appropriate, the relative distance of a plurality of contours, enable verification of the data obtained by mathematical formulas and correction thereof. Other correction methods implying calculation redundancy, addition of supplementary pixels or calibration of the elements used may nevertheless be considered.

In this way an analog-digital conversion is not necessary because the information from the comparator is a logic value and thus directly digital, enabling limitation of errors linked to the converter.

Thus the transmission of data can be simplified and its speed increased.

In particular, the first logic value may be the value 0 and the second logic value may be the value 1. In this particular instance, the threshold is equal to 0.5.

This notably enables accurate determination of the position of the optical member by converting only a few analog values, which limits the use of the converter at the same time as improving the overall accuracy of the device.

Once again, transmission of the data can be simplified and its speed increased compared to prior art systems.

In particular, the first logic value may be the value 0 and the second logic value may be the value 1. These thresholds may take any value between 0 and 1, in particular a first threshold for example between 0 and 0.5 and a second threshold between 0.5 and 1. For example, the first threshold is equal to 0.1 and the second threshold is equal to 0.9.

In order to obtain accurately the physical position of each pixel of the sensor, the device further includes a module for addressing pixels of said at least one sensor according to the logic value that has been assigned to them.

This makes it possible to facilitate the calculation of the position of the optical member.

To detect any errors, the addressing values of the pixels the captured values of which are situated between said first and second thresholds are compared to the number of pixels counted in each group.

The invention also concerns a microphone including a movement measuring device of the invention.

The invention also concerns a movement measuring method including the following steps:
emitting a light beam;
positioning an optical member adapted to intercept the light beam and connected to said mobile element to track its movement;
capture by a pixel type sensor of the transmitted beam determined by the relative position of the optical member relative to the light source, the pixels being disposed so that at least some of them receive an illumination varying with the position of the mobile element as it moves:
comparing the values obtained by capture with two distinct thresholds to assign them logic values so that:
all luminous values below the first threshold are assigned the same first logic value;
all luminous values above the second threshold are assigned the same second logic value;
all luminous values situated between the two thresholds are respectively assigned a conversion of that value representative of that value adapted to be processed by the calculation means; and
determining the position of the mobile element from the data from the comparator module.

BRIEF DESCRIPTION OF THE DRAWINGS

Other features and advantages will become apparent in the course of the following description, which is given by way of nonlimiting example and with reference to the appended drawings, in which:

FIG. 5a is an enlargement of a detail from FIG. 2a;

DETAILED DESCRIPTION OF THE PREFERRED EMBODIMENTS

Figure 1:
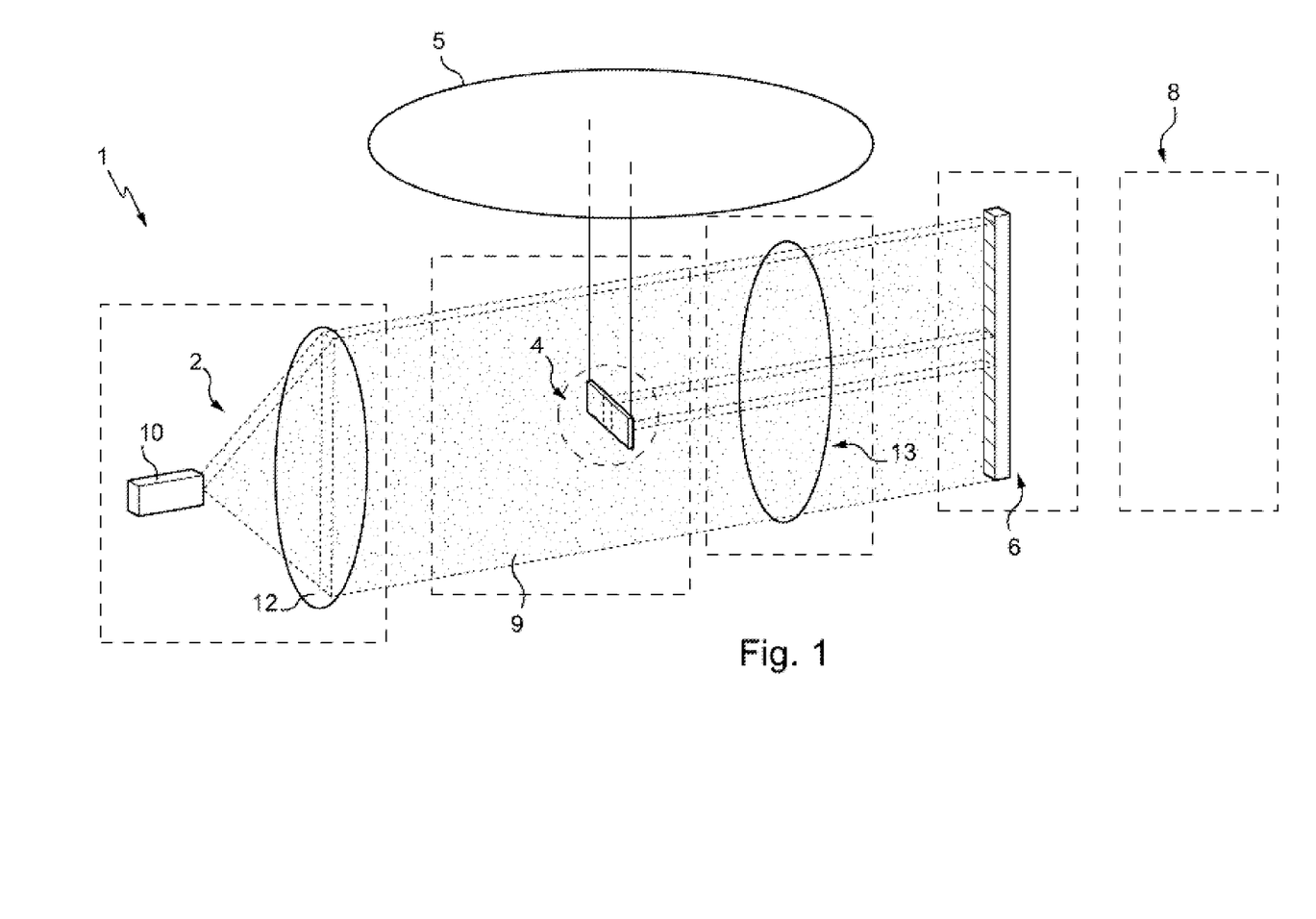
FIG. 1 is a diagrammatic perspective view of a movement measuring device of the invention.

The movement measurement device 1 shown by way of example in FIG. 1 includes at least one light source 2, an optical member 4 connected to a mobile part 5 of the element the movement of which is to be measured, a sensor 6, and analysis means 8 (represented diagrammatically here and not in its final implementation form).

The light source 2 creates a fixed light beam 9 following an optical path in order to be captured by the sensor 6.

The light source 6 is notably able to emit at least one wavelength adapted to the sensitivity of the sensor, likewise its power, in order to exploit a large part of its dynamic range.

The light beam 9 that it generates is preferably of homogeneous intensity in space and constant intensity in the measurement time of the sensor 6.

Alternatively, the light beam 9 may be more intense in some particular areas.

In the embodiment shown in FIG. 1, the light source is a line generator laser 10. Other solutions may be envisaged, however.

In particular, it may be an LED, a laser diode or a laser diode strip, a telecentric laser, a pulsed laser, a laser line generator or combinations of any of these solutions with one or more lenses, an optical fibre assembly, an optical fibre taper, a collimator, one or more mirrors.

The light source 2 may optionally be associated with one or more optical devices 12 enabling a more homogeneous light beam 9 to be formed, sized, deformed or directed. In the embodiment shown in FIG. 1, the optical device 12 is a lens.

In other embodiments that are not shown, the light source 2 is duplicated to generate parallel luminous planes toward a plurality of sensors or a sensor with a plurality of rows of pixels. This light source is or these light sources are notably adapted to emit a plurality of wavelengths or luminous planes of different intensities in order to improve the reliability of the sensor. In particular, each wavelength emitted by the source or sources is chosen to limit interference with ambient light.

After passing through the lens 12 or any of the other optical devices cited above, the light beam 9 is intercepted on its optical path by the optical member 4.

The optical member 4 is an element fastened to or forming part of the mobile part 5 the movement of which to be measured. It is preferably made from a rigid, opaque or reflective material (or one having a reflective coating), or a material diverting light (optical fibre) depending on the various embodiments. It is preferably of negligible mass compared to the mass of the mobile part in order to limit any influence that it could have on its movement.

The optical member 4 is positioned in a plane containing the measured spatial dimension or dimensions of the movement or in a plane parallel to the latter plane. In all cases, the plane in which the optical member 4 is situated intersects the light beam 9.

In the embodiment shown in FIG. 1, the mobile part 5 moves vertically. Here the optical member 4 is opaque and intercepts the light beam 9, which is projected transversely, in a direction that is advantageously perpendicular to the movement, i.e. horizontal.

In this way, as it moves, the optical member 4 blocks a variable part of the light beam and delimits a variable area that will be referred to hereinafter as the shadow area. Each part that is not blocked is then projected onto and captured by the pixels of the sensor 6.

In a first alternative embodiment that is not shown, the optical member 4 comprises reflection means such as one or more mirrors in order to reflect a variable part of the light beam 9 as it moves. Each reflected portion of the light beam 9 is then projected onto the pixels of the sensor 6.

In all cases, the dimensions of the optical member 4 are chosen so that the maximum length and the thickness of the shadow area or the luminous image projected onto the sensor are appropriate to the dimensions of the total sensitive surface of the sensor.

For example, in the embodiment shown in FIG. 1, the optical member 18 μm high is centred on a linear sensor comprising 256 pixels, each pixel being a square with a side length of 12 μm.

In particular, the light beam 9 can have a thickness such that the light from it that is projected onto the sensor 6 covers a great portion or the whole of the sensitive surface of the pixels of the sensor 6.

The device 1 may also include on the optical path between the optical member 4 and the sensor 6 a fixed optical projection member 13 the function of which is notably to enhance the quality of the image received by the sensor.

In particular, this projection optical member 10 comprises, individually or in combination, means for focussing the optical image on the sensor, means for redirecting the light beam 9 in the direction of the sensor 6, and means for sizing the image of the optical member 4 on the sensor 6.

In the embodiment shown in FIG. 1, the projection optical member 13 is a plano-concave lens.

Other elements may be envisaged, however, such as a convergent or convex lens, a mirror, optical fibre or an optical fibre taper.

In the embodiment shown in FIG. 1, as well as in FIGS. 2a-c, 3a-c 4a-f and 5a-b, the sensor 6 is a linear optical sensor formed of at least one row of pixels aligned or disposed in a linear pattern; in other words the pixels extend along a line to form a continuous linear sensitive surface.

The sensor 6 is positioned so that the movement of the image of the optical member 4 thereon is proportional to the movement of the mobile part 5 within the measured spatial dimension or dimensions.

The number of pixels of the sensor 6 is a function of the additional digital accuracy required compared to a single pixel. If this additional accuracy is of n bits, the number of pixels of the sensor is $2^n$. Accordingly, an additional accuracy of 8 bits necessitates 256 pixels, for example.

The sensor 6 is notably a CCD (Charge-Coupled Device) sensor, a CMOS (Complementary Metal Oxide Semiconductor) sensor, a photodiode array type sensor or an electronic or optical obturator type sensor.

Figures 2A, 2B, 2C:
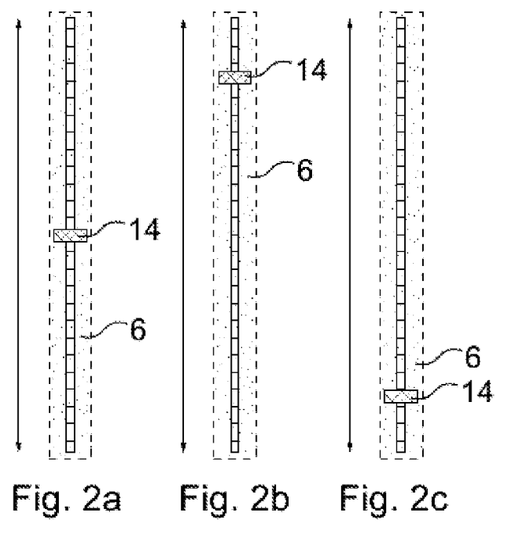
FIG. 2a is a diagrammatic view of the projection of the image of the optical sensor onto the sensor of the device of the invention and pixels of the same sensor, the optical member being in a first position.
FIG. 2b is a diagrammatic view of the projection of the image of the optical member onto the sensor of the device of the invention and pixels of the same sensor, the optical member being in a second position.
FIG. 2c is a diagrammatic view of the projection of the image of the optical member onto the sensor of the device of the invention and pixels of this same sensor, the optical member being in a third position.

FIGS. 2a-c show three positions of the shadow area 14 projected by the optical member 4 from FIG. 1. In these figures, the shadow area 14 is a rectangle the sides of which are parallel to those of the pixels and which move along the direction of alignment of the pixels of the sensor 6.

In FIG. 2a, the mobile part being in a median position, the optical member 4 is in a median position, and the shadow area 14 thus has a median position on the array of pixels of the sensor 6.

In FIG. 2b, the optical member 4 is in a high position, and the shadow area 14 is therefore positioned toward the upper pixels on the sensor 6.

In FIG. 2c, the optical member 4 is in a low position, and the shadow area 14 is therefore placed toward the lower pixels on the sensor 6.

Figure 3A:
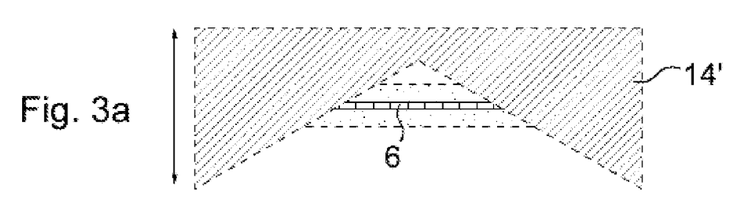
FIG. 3a is an alternative to FIG. 2a, the optical member having a different shape and the pixels of the sensor being aligned in a horizontal direction.
Figure 3B:
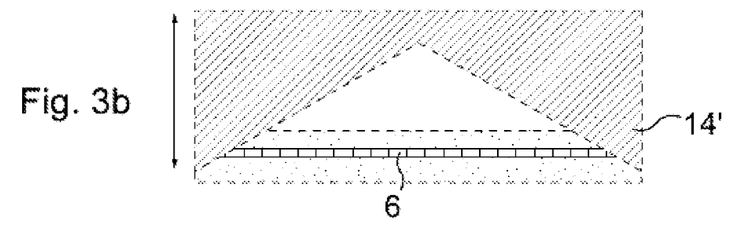
FIG. 3b is an alternative to FIG. 2a, the optical member having a different shape and the pixels of the sensor being aligned in a horizontal direction.
Figure 3C:
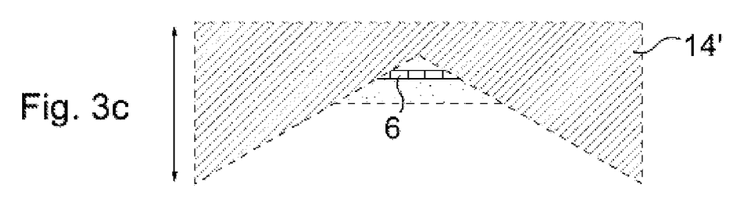
FIG. 3c is an alternative to FIG. 2a, the optical unit having a different shape and the pixels of the sensor being aligned in a horizontal direction.

Alternatively, the optical member 4 has two non-parallel contours at a non-zero angle to the direction of movement of the mobile element 5, for example the optical member the shadow area 14' of which is represented in FIGS. 3a-3c. It will be noted that in these figures the direction of the movement of the mobile element 5 is perpendicular to that of the row of pixels of the sensor 6.

Here the shadow area 14' has the shape of a rectangle hollowed out by a triangle the contours of the internal edges of which block the light received by the pixels of the sensor 6.

Thus in FIG. 3a the optical member 4 is in a median position and the shadow area 14' therefore covers the peripheral pixels and some of the pixels of the central part of the array of the optical sensor 6.

In FIG. 3b, the optical member 4 is in a high position, and the shadow area 14' therefore covers the peripheral pixels of the optical sensor 6.

In FIG. 3c, the optical member 4 is in a low position, and the shadow area 14' therefore covers almost all the peripheral pixels of the optical sensor 6 with the exception of the median pixels.

Different possible arrangements of the array of pixels of the optical sensor 6 are described next.

Figure 4A:
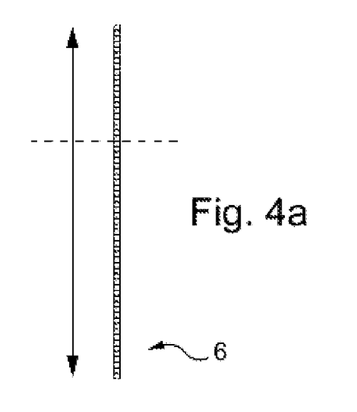
FIG. 4a is a diagrammatic view of the projection of the contour of the image of the optical member on the sensor of the device of the invention and of pixels of the same sensor, the pixels being in a configuration corresponding to a first embodiment.
Figure 4B:
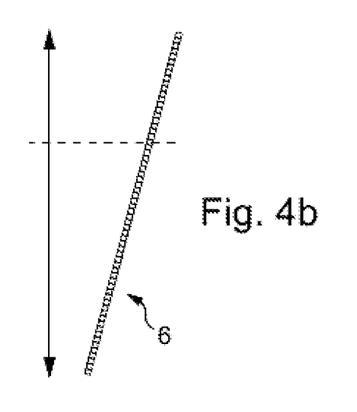
FIG. 4b is a diagrammatic view of the projection of the contour of the image of the optical member onto the sensor of the device of the invention and pixels of the same camera, the pixels being in a configuration corresponding to a second embodiment.
Figure 4C:
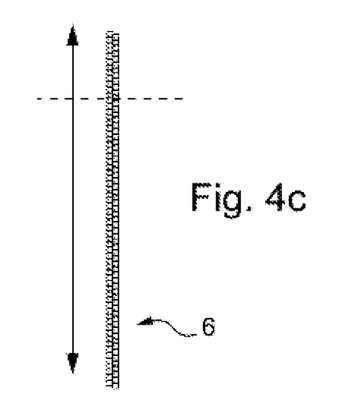
FIG. 4c is a diagrammatic view of the projection of the contour of the image of the optical member onto the sensor of the device of the invention and the pixels of the same sensor, the pixels being in a configuration corresponding to a third embodiment.
Figure 4D:
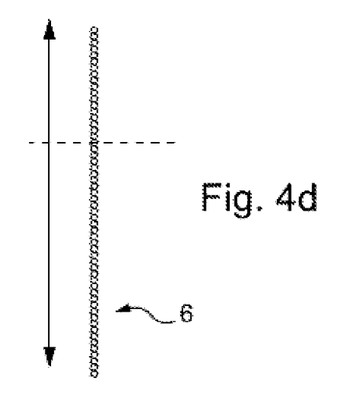
FIG. 4d is a diagrammatic view of the projection of the contour of the image of the optical member onto the sensor of the device of the invention and of pixels of the same sensor, the pixels being in a configuration corresponding to a fourth embodiment.
Figure 4E:
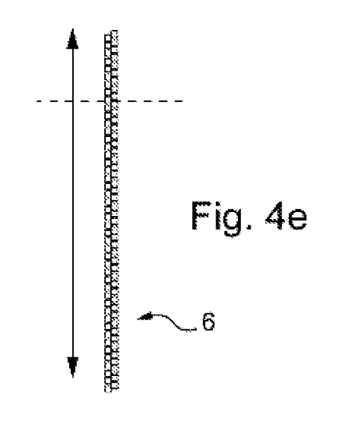
FIG. 4e is a diagrammatic view of the projection of the contour of the image of the optical member onto the sensor of the device of the invention and pixels of that same sensor, the pixels being in a configuration corresponding to a fifth embodiment.
Figure 4F:
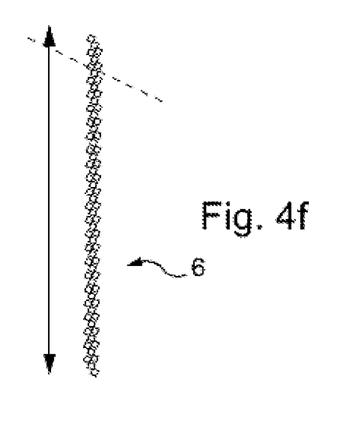
FIG. 4f is a diagrammatic view of the projection of the contour of the image of the optical member onto the sensor of the optical device of the invention and pixels of the same sensor, the pixels being in a configuration corresponding to a sixth embodiment.

In the particular embodiments shown in FIGS. 4c, 4e and 4f, the pixels are aligned in two rows (although more rows may be envisaged), in order to furnish a mechanical correction of undesirable lateral movements of the optical member or other elements of the device, oversampling and/or improvement of the dynamic of the sensor 6.

Each row of pixels is sensitive to a different wavelength, for example.

Alternatively, in the embodiments shown in FIGS. 4b, 4d and 4f, the pixels are inclined relative to each other.

Figure 5A:
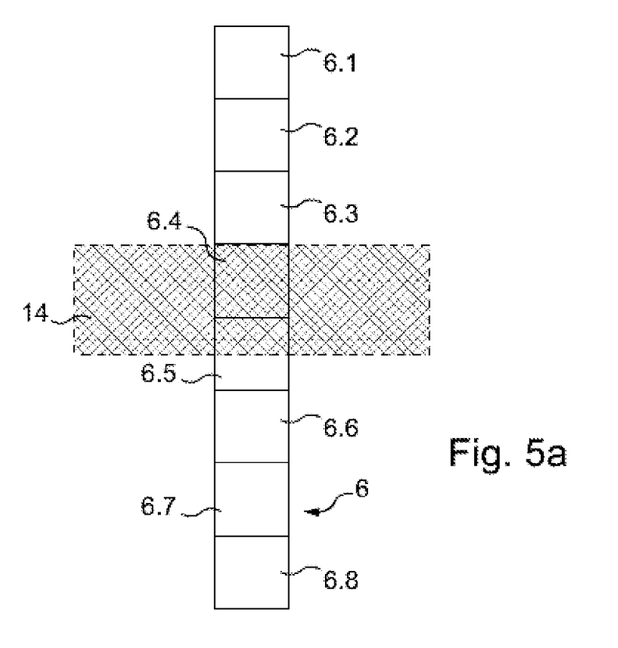

In this embodiment, for which an enlargement of FIG. 2a is shown in FIG. 5a, the contour of the shadow area and the sides of the pixels are parallel. They may nevertheless be oblique, as in the embodiment shown in FIG. 5b, for example.

Figure 5B:
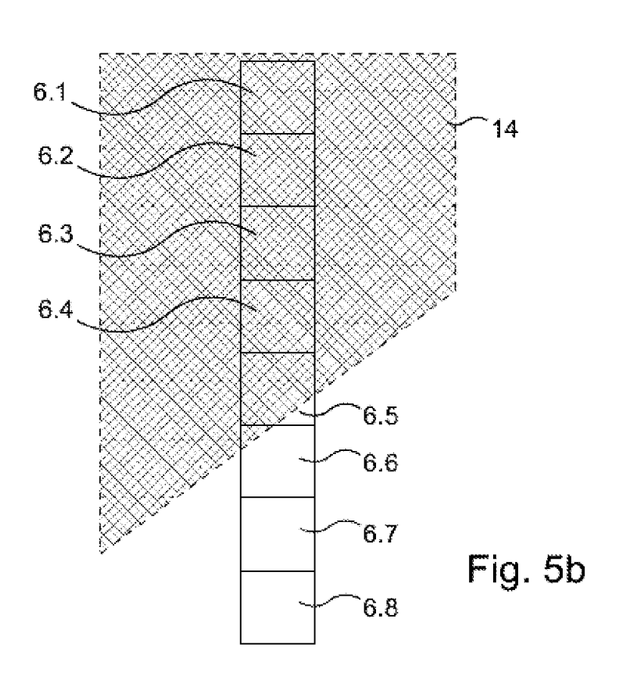
FIG. 5b is an alternative to FIG. 5a, the optical member having a contour transverse to the horizontal.

In these figures, the shadow area 14 moves with the mobile part 5 via the movement of the optical member 4, here along the vertical. Thus the shadow area 14 illuminates different pixels of the sensor 6 in each position.

To be more precise, in FIG. 5a the shadow area 14, the height of which corresponds to one and a half pixels (this height varies with the dimensions of the optical member 4) shades entirely the pixel 6.4 and shades partially the pixel 6.5. The other pixels 6.1, 6.2, 6.3, 6.6, 6.7 and 6.8 are for their part totally illuminated by the light beam 9 from the light source 2.

Each of the pixels 6.n is allocated an analog or digital value proportional to the light received delivered by each pixel. Its value is then analyzed by the analysis means 8. In the case of a single measurement, it enables calculation of the position of the mobile part 5. In the case of cyclic measurement, it enables the calculation of a digital signal representative of the vibrations of the mobile part.

Figure 6:
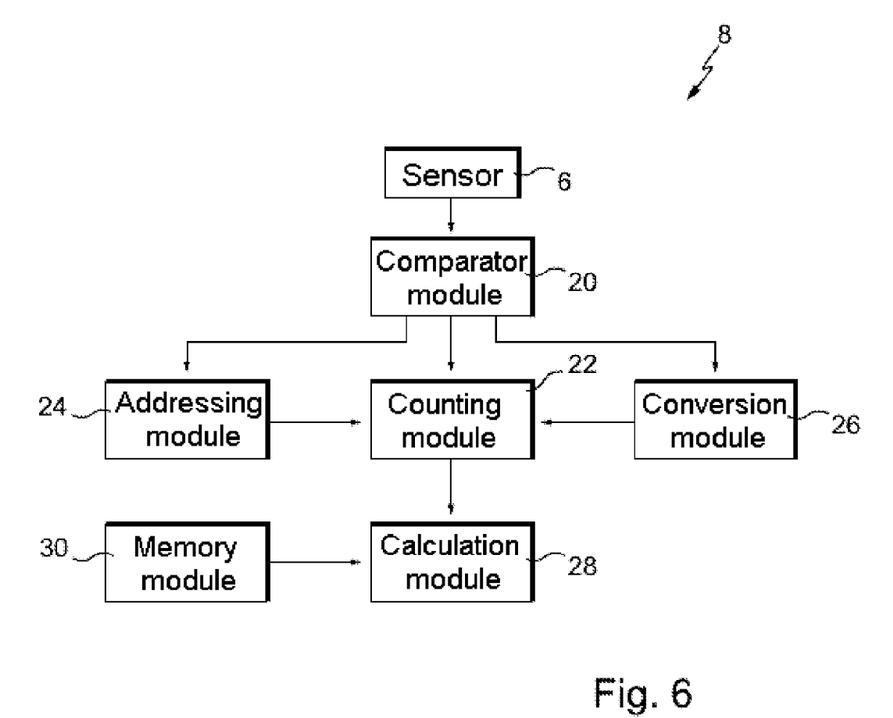
FIG. 6 is a block diagram illustrating the relations between the various modules of the invention.

FIG. 6 shows the operation of the analysis means 8 via the various modules that it includes. It should be noted that these modules are not necessarily independent and may be integrated directly into certain elements such as the sensor. For example, the addressing module may be integrated directly into the sensor.

The electrical or digital values of the pixels of the sensor 6 are transmitted to the comparator module 20 by an addressed parallel output, for example, or in the form of a pulse stream, as a function of the type of sensor used.

The comparator module 20 sorts the pixels by comparing their analog or digital value to one or more thresholds.

In a first embodiment there is only threshold S, corresponding for example to half the light saturation value of the pixel.

The pixels delivering a value below this threshold S are considered as being exclusively in a shadow area. Their values are ignored and a logic value GB (bottom group B) is sent to the counting module 22 for counting them.

The pixels delivering a value above this threshold S are considered as being exclusively in an illuminated area. Their values are ignored and a logic value GH (high group H) is sent to the counting module 22 for counting them.

In a second embodiment, the comparator module 20 sorts the pixels by comparing them to two thresholds, a low threshold SB and a high threshold SH. The first threshold preferably corresponds to a value from 0 to 0.5 times the light saturation value of a pixel, for example 0.1. The second threshold preferably corresponds to a value from 0.5 to 1 times the light saturation value of a pixel, for example 0.9.

The pixels delivering a value below the threshold SB are considered as being exclusively in a shadow area. Their values are ignored and a logic value GB (bottom group B) is sent to the counting module 22 for counting them.

The pixels delivering a value above the threshold SH are considered as being exclusively in an illuminated area. Their values are ignored and a logic value GH (high group H) is sent to the counting module 22 for counting them.

Values between the two thresholds are sent to the conversion module 26. They correspond to the partially illuminated edge pixels (6.4 and 6.5 in FIG. 5a) that define the contour of the optical member 4.

The conversion module 26 is either an analog/digital converter in the case of an analog optical sensor or a digital/digital converter in the case of a digital optical sensor or a sensor with integral converter.

Thus the conversion module 26 converts the analog or digital value obtained from the analyzed pixel into a logic (digital) value that is sent to the counting module 22.

Whatever the embodiment, in parallel with the operation of the comparator module 20 and the conversion module 26, the addressing module 24 collects the address of each pixel, in other words its physical position on the sensor.

The address is supplied by the sensor 6 or obtained by identification of the parallel outputs of the sensor (independent outputs per pixel or per group of pixels, to enable a higher reading frequency) and/or obtained by counting arriving serial data. The collected information is transmitted to the counting module 22.

The counting module 22 counts the pixels and assigns them to groups as a function of the logic value transmitted by the comparator module 20. It also associates with them the information coming from the addressing module 24. Thus each pixel is associated with an address and a logic value.

In the case of an embodiment with two thresholds, the logic values indicating an edge pixel (i.e. one delivering a value between the thresholds SB and SH) notably enable confirmation of the correct delimitation of the groups of pixels.

At the end of this analysis cycle, the number, type and address of the pixels contained in each group and their designation are sent to the calculation module 28.

The calculation module 28 collects the data from the counting module 22 and corrects any errors by comparing the information received to reference information and calculating its digital offset.

A first type of correction includes comparing the addressing values of the so-called edge pixels to the pixels counted in each group. If a disparity is detected, it is corrected by the calculation module 28.

Instead of this or in addition to this, the calculation module 28 uses the information from the memory module 30 that contains reference data to compare it with the measured data. This information corresponds to the data obtained when the mobile part is in its reference position. Such data is reinitialized or stored for example during a calibration procedure. For a measurement relative to the preceding position or a measurement of movement the data for the preceding measurement will be used.

The memory module 30 can also contain characteristics of the device 1 such as the dimensions of the optical member 4 and another data enabling correction of errors.

In particular, during calibration, the memory module integrates a reference calibration point or a set of such points and an interpolation model for the intermediate values. Such interpolation employs a linear model or includes optical deformation or electronic distortion models.

Instead of this or in addition to this an autocalibration protocol is implemented in the device 1 to enable account to be taken of wear, modifications of the medium in which the measurement is effected (pressure, temperature, etc.) or deformation of the optical member 4 or any other element of the device.

To this end information such as the rest position of the mobile part 5 and/or the dimensions of the optical member 4 are updated periodically.

Finally, the optical laws concerning the projection of the contour of the optical member 4 enable verification and correction of the data. In particular, trigonometric correction of the movements of the optical member 4 in spatial dimensions other than those of the measured movement may be effected.

Once any errors have been corrected, the calculation module 28 determines the pixels receiving the image of the contour of the optical member 4. If the image of the contour is between two pixels, the consecutive succession of a pixel from one group and a pixel from another group indicates this position. The first pixel after the group transition is selected as the location of the contour.

In the case of the embodiment with two thresholds, these pixels are notably looked for in the group associated with the values between the two thresholds.

Thus the position of the contour of the optical member 4 is determined and consequently that of the mobile part 5.

In particular, the accuracy of the calculation module 28 is N+n where N is the accuracy in bits of the conversion module 26 and n is the number of pixels in the said sensor. The accuracy of the device is therefore increased relative to the accuracy of the conversion module 26.

The embodiments of the device and method described above are merely possible embodiments of the invention, which is not limited to them.

The invention claimed is:

1. A device for measuring movement of a mobile element moving in at least one direction, comprising:
    a light source adapted to emit a light beam;
    at least one optical member adapted to intercept the light beam emitted by the light source and adapted to be attached to said mobile element in order to have a same movement as the mobile element relative to the light source;
    at least one pixel-type sensor, separate from the optical member and fixed with respect to the light source, adapted to capture a modified light beam emerging from the optical member, the optical member arranged on a path of the light beam emitted by the light source such that the modified light beam emerging from the optical member is determined by a relative position of the optical member relative to the light source,
    the sensor comprising light-sensing pixels disposed so that at least some of the pixels receive illumination from the modified light beam that varies with the relative position of the mobile element in accordance with the movement of the mobile element;
    a comparator module adapted to compare values obtained from the pixels of said at least one sensor with first and second distinct thresholds, and to assign logic values to the values as output data, such that:
        all luminous values below the first threshold are assigned a same first logic value,
        all luminous values above the second threshold are assigned a same second logic value, and
        all luminous values situated between the first and second thresholds are respectively assigned converted values adapted to be processed by the calculation means; and
    a calculation module adapted to determine and produce an output indicative of the relative position of the mobile element from the output data from the comparator module.

2. The movement measuring device according to claim 1, wherein the optical member comprises a mask, at least part of a contour of which forms a non-zero angle with said direction of movement of the mobile element.

3. The movement measuring device according to claim 2, further comprising:
    a second optical member adapted to size and focus an image of a contour of the first optical member.

4. The movement measuring device according to claim 2, wherein the at least one sensor is a linear optical sensor formed of at least one row of pixels disposed in a linear pattern.

5. The movement measuring device according to claim 2, wherein the calculation module is adapted to apply trigonometrical correction to the movements of the optical member in directions other than that of the measured movement.

6. The movement measuring device according to claim 2, further comprising:
 a module for addressing the pixels of said at least one sensor in an order of arrival of data received from the pixels.

7. The movement measuring device according to claim 2, further comprising:
 a module for counting pixels of said at least one sensor forming groups according to an address and the logic value assigned to each one of the pixels.

8. The movement measuring device according to claim 1, wherein the optical member is adapted to reflect only a part of the light beam emitted by the light source.

9. The movement measuring device according to claim 1, further comprising:
 a second optical member adapted to size and focus an image of a contour of the first optical member.

10. The movement measuring device according to claim 1, wherein the at least one sensor is a linear optical sensor formed of at least one row of pixels disposed in a linear pattern.

11. The movement measuring device according to claim 1, wherein the calculation module is adapted to apply trigonometrical correction to the movements of the optical member in directions other than that of the measured movement.

12. The movement measuring device according to claim 1, further comprising:
 a module for addressing the pixels of said at least one sensor in an order of arrival of data received from the pixels.

13. The movement measuring device according to claim 12, wherein addressing values of the pixels for which captured values are situated between said first and second thresholds are compared to a number of pixels counted in each group.

14. The movement measuring device according to claim 1, further comprising:
 a module for counting pixels of said at least one sensor forming groups according to an addressing value and the logic value assigned to each one of the pixels.

15. The movement measuring device according to claim 14, wherein the addressing values of the pixels for which captured values are situated between said first and second thresholds are compared to a number of pixels counted in each group.

16. A microphone, comprising a movement measurement device according to claim 1.

17. A method of measuring a movement of a mobile element moving in at least one direction, comprising:
 emitting a light beam from a light source;
 connecting, to said mobile element, an optical member adapted to intercept the light beam, where the optical member is adapted to have a same movement as the mobile element relative to the light source;
 capturing output values from a pixel type sensor positioned on an optical path of the light beam from the light source, the sensor comprised of light-sensing pixels, the output values correspondent to the light beam received at the sensor and determined by a relative position of the optical member relative to the light source of the light beam, the pixels of the sensor being disposed so that at least a portion of the total number of said pixels receive an illumination that varies with a change in the relative position of the mobile element during said movement;
 comparing the captured values with first and second distinct thresholds, and assigning logic values to the captured values as comparator output, such that:
  all luminous values below the first threshold are assigned a same first logic value,
  all luminous values above the second threshold are assigned a same second logic value, and
  all luminous values situated between the first and second thresholds are respectively assigned converted values adapted to be processed by the calculation means; and
 determining and outputting an output indicative of the relative position of the mobile element from the comparator output.

* * * * *